United States Patent
Chen

(10) Patent No.: US 12,288,339 B2
(45) Date of Patent: Apr. 29, 2025

(54) IMAGE PROCESSING METHOD AND APPARATUS, AND COMPUTER-READABLE STORAGE MEDIUM

(71) Applicant: Tencent Technology (Shenzhen) Company Limited, Guangdong (CN)

(72) Inventor: Kaode Chen, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 402 days.

(21) Appl. No.: 17/969,618

(22) Filed: Oct. 19, 2022

(65) Prior Publication Data
US 2023/0045166 A1    Feb. 9, 2023

Related U.S. Application Data

(63) Continuation of application No. PCT/CN2021/126879, filed on Oct. 28, 2021.

(30) Foreign Application Priority Data

Nov. 25, 2020  (CN) .......................... 202011340200.3

(51) Int. Cl.
*G06T 7/136*   (2017.01)
*G06T 7/90*    (2017.01)

(52) U.S. Cl.
CPC .............. *G06T 7/136* (2017.01); *G06T 7/90* (2017.01)

(58) Field of Classification Search
CPC . G06T 7/136; G06T 7/90; G06T 2207/10016; G06T 2207/10024;
(Continued)

(56) References Cited

U.S. PATENT DOCUMENTS 10,673,921 B2 * 6/2020 Wang .................. H04L 41/5067
2003/0228050 A1 * 12/2003 Geshel .................... G06T 7/001
382/149

(Continued)

FOREIGN PATENT DOCUMENTS

CN    1622640 A    6/2005
CN    101527855 A   9/2009
(Continued)

OTHER PUBLICATIONS

International Search Report and Written Opinion issued in International Application No. PCT/CN2021/126879, mailed Feb. 8, 2022, with English Translation, 11 pages.

*Primary Examiner* — Ali Bayat
(74) *Attorney, Agent, or Firm* — ArentFox Schiff LLP

(57) ABSTRACT

An image processing method is provided. For each frame of a video stream, a pixel digital frame mask in the respective frame of the video stream is obtained. The pixel digital frame mask of the respective frame includes a plurality of preset pixel position sets. At least two target preset pixel position sets are determined from the plurality of preset pixel position sets that form a frame sequence number of the respective frame based on values of pixels included in the at least two target preset pixel position sets. A frame sequence number corresponding to the respective frame of the video stream is determined according to positions of the at least two target preset pixel position sets in the pixel digital frame mask in the respective frame. Further, video fluency of the video stream is determined based on the frame sequence numbers.

20 Claims, 5 Drawing Sheets

(58) Field of Classification Search
CPC ......... G06T 2207/30168; G06T 7/0002; G06T 7/11; A63F 13/355; A63F 13/358; G06V 20/46; H04N 21/23608; H04N 21/4344
USPC ....................................................... 382/199
See application file for complete search history.

(56) References Cited

U.S. PATENT DOCUMENTS

| | | | |
|---|---|---|---|
| 2006/0238648 A1* | 10/2006 | Wogsberg | H04N 21/43615 348/441 |
| 2008/0165107 A1* | 7/2008 | Yang | G09G 3/2022 345/89 |
| 2013/0259139 A1 | 10/2013 | Valdez et al. | |
| 2015/0243324 A1* | 8/2015 | Sandrew | H04N 13/266 386/278 |
| 2019/0089966 A1* | 3/2019 | Mandapadi Ramasubramanian | H04N 19/109 |
| 2021/0120232 A1* | 4/2021 | Srikantam | H04N 19/172 |

FOREIGN PATENT DOCUMENTS

| | | |
|---|---|---|
| CN | 103942741 A | 7/2014 |
| CN | 112184739 A | 1/2021 |

\* cited by examiner

IMAGE PROCESSING METHOD AND APPARATUS, AND COMPUTER-READABLE STORAGE MEDIUM

RELATED APPLICATIONS

The application is a continuation of International Application No. PCT/CN2021/126879, entitled "IMAGE PROCESSING METHOD AND APPARATUS, AND COMPUTER-READABLE STORAGE MEDIUM" and filed on Oct. 28, 2021, which claims priority to Chinese Patent Application No. 202011340200.3, entitled "IMAGE PROCESSING METHOD AND APPARATUS, AND COMPUTER-READABLE STORAGE MEDIUM" and filed on Nov. 25, 2020. The entire disclosures of the prior applications are hereby incorporated by reference in their entirety.

FIELD OF THE TECHNOLOGY

This application relates to the field of communications technologies, including to an image processing method and apparatus, and a computer-readable storage medium.

BACKGROUND OF THE DISCLOSURE

With the rapid development of the Internet technologies, a computer device has an increasingly stronger processing capability, so that many applications based on human-machine interaction have emerged, such as cloud gaming. A game host of the cloud gaming is on a server, and a gamer is connected to the server through a local network. When the gamer plays a game, the server transmits a game picture in real-time through the network for vivid interactive entertainment.

Fluency of the cloud gaming needs to be evaluated to find a frame rate at which the game appears to be smooth to a user. To achieve an evaluation process, frame dropping processing may be performed on a video stream of the cloud gaming repeatedly and fluency may be detected according to the video stream after the frame dropping processing until a proper frame rate of the video stream is found.

SUMMARY

Embodiments of this disclosure include an image processing method and apparatus, and a non-transitory computer-readable storage medium, which can improve an accuracy rate of image detection, thereby improving the accuracy of fluency evaluation of a cloud application.

An image processing method is provided. For each frame of a video stream, a pixel digital frame mask in the respective frame of the video stream is obtained. The pixel digital frame mask of the respective frame includes a plurality of preset pixel position sets. For each frame of the video stream, at least two target preset pixel position sets are determined from the plurality of preset pixel position sets that form a frame sequence number of the respective frame based on values of pixels included in the at least two target preset pixel position sets. For each frame of the video stream, a frame sequence number corresponding to the respective frame of the video stream is determined according to positions of the at least two target preset pixel position sets in the pixel digital frame mask in the respective frame. Further, video fluency of the video stream is determined based on the frame sequence numbers.

An image processing apparatus including processing circuitry is provided. The processing circuitry is configured to obtain, for each frame of a video stream, a pixel digital frame mask in the respective frame of the video stream, the pixel digital frame mask of the respective frame including a plurality of preset pixel position sets. The processing circuitry is configured to determine, for each frame of the video stream, at least two target preset pixel position sets from the plurality of preset pixel position sets that form a frame sequence number of the respective frame based on values of pixels included in the at least two target preset pixel position sets. The processing circuitry is configured to determine, for each frame of the video stream, a frame sequence number corresponding to the respective frame of the video stream according to positions of the at least two target preset pixel position sets in the pixel digital frame mask in the respective frame. Further, the processing circuitry is configured to determine video fluency of the video stream based on the frame sequence numbers.

An embodiment of this disclosure further provides an electronic device, including: a processor; and a memory connected to the processor, the memory storing machine-readable instructions, the machine-readable instructions being executable by the processor to implement the image processing method.

An embodiment of this disclosure further provides a non-transitory computer-readable storage medium, storing instructions which when executed by one or more processors cause the one or more processors to perform the image processing method.

BRIEF DESCRIPTION OF THE DRAWINGS

To describe technical solutions in the embodiments of this disclosure more clearly, the following briefly describes the accompanying drawings for describing the embodiments. The accompanying drawings in the following description show merely some exemplary embodiments of this disclosure. Other embodiments are within the scope of this disclosure.

DESCRIPTION OF EMBODIMENTS

The following describes technical solutions in the embodiments of this disclosure with reference to the accompanying drawings in the embodiments of this disclosure. The described embodiments are merely some but not all of the embodiments of this disclosure. Other embodiments are within the scope of this disclosure.

The embodiments of this disclosure provide an image processing method and apparatus, and a computer-readable storage medium.

Figure 1:
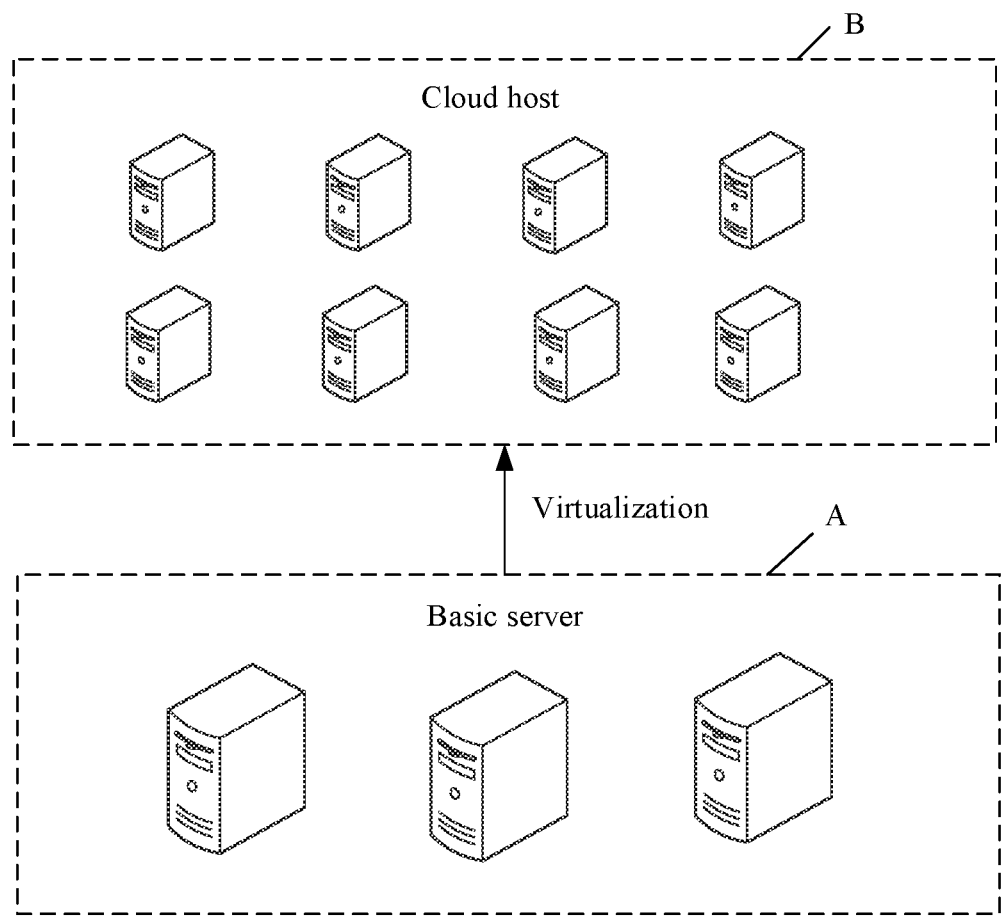
FIG. 1 is a schematic diagram of a scenario of an image processing system according to an embodiment of this disclosure.

FIG. 1 is a schematic diagram of a scenario of an image processing system according to an embodiment of this disclosure, including: a basic server A and a virtualized cloud host B (more basic servers A and virtualized cloud hosts may be provided, and specific quantities are not limited herein). The basic server A is a physical machine, or may be referred to as a physical server, which is a name of a physical computer relative to a virtual machine. The physical machine provides the virtual machine with a hardware environment, and is also referred to as a "host". The basic server A may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. Through virtualization of the basic server A, a plurality of cloud hosts B may be virtualized from each basic server A. The cloud host B is a virtual machine, or may be referred to as a virtual private server (VPS), which is a technology that partitions a server into a plurality of virtual independent dedicated servers. Each virtual independent server using the VPS technology includes its own independent public network Internet protocol (IP) address, operating system, hard disk space, internal memory space, central processing unit (CPU) resource and the like, and may perform operations such as installing a program and restarting a server, which is completely the same as running an independent server. That is to say, at a software level, a server is virtualized and divided into a plurality of servers, so that a user who only needs a low computing capability can enjoy computing resources of a large server. In a broad sense, the cloud host B is the VPS, except that the cloud host B further virtualizes all basic resources, such as internal memory bandwidth, on all basic servers A or virtual machines. The advantage of the cloud host B is that the cloud host B can store data in a distributed manner and dynamically expand basic resources, and has high security and scalability.

Each cloud host B includes an independent operating system and a hardware structure, which is completely the same as running an independent server, except that physical addresses in each cloud host B is a physical address of a virtual machine. A plurality of processors may be installed in each cloud host B. For example, a plurality of graphics processing units (GPU) are installed in one cloud host B. One cloud host B may be similar to a VM ware virtual machine and one physical machine may virtualize a plurality of Android operating system instances, where a game board or container may be installed in the cloud host B to simulate a terminal environment of the user without a physical display screen, for example, running cloud gaming. The cloud gaming is also referred to as gaming on demand, and is an online gaming technology based on a cloud computing technology. A cloud gaming technology enables a thin client with limited graphics processing capability and data computing capability to run a high-quality game. In a cloud gaming scenario, a game is run in a cloud server instead of a game terminal of a player, and a gaming scenario is rendered to be a video audio stream by the cloud server and is transmitted to the game terminal of the player through a network. The game terminal of the player does not need to have a powerful graphics computing and data processing capability, but only needs to have a basic streaming media playback capability and capabilities of obtaining player input instructions and transmitting the player input instructions to the cloud server.

In this way, the cloud host B may perform the following steps: obtaining a pixel digital frame mask in an image of each frame in a video stream of the cloud gaming, the pixel digital frame mask including a plurality of preset pixel position sets; determining at least two target preset pixel position sets including first preset pixels from the plurality of preset pixel position sets, the first preset pixels being set to a specified color to represent a frame sequence number of the image; determining, for the video stream, a frame sequence number corresponding to the image of each frame according to a position relationship between the at least two target preset pixel position sets; and determining video fluency of the video stream according to the frame sequence numbers, which greatly improve an accuracy rate of image detection, thereby improving the accuracy of fluency evaluation of the cloud gaming.

The schematic diagram of the scenario of the image processing system shown in FIG. 1 is merely an example. The image processing system and the scenario described in the embodiments of this disclosure are intended to more clearly describe the technical solutions in the embodiments of this disclosure, and do not constitute a limitation on the technical solutions provided in the embodiments of this disclosure. A person of ordinary skill in the art should understand that, with evolution of the image processing system and appearance of a new service scenario, the technical solutions provided in the embodiments of this disclosure are also applicable to a similar technical problem.

Based on the description of the foregoing application scenario, exemplary details are described as follows.

Figure 2:
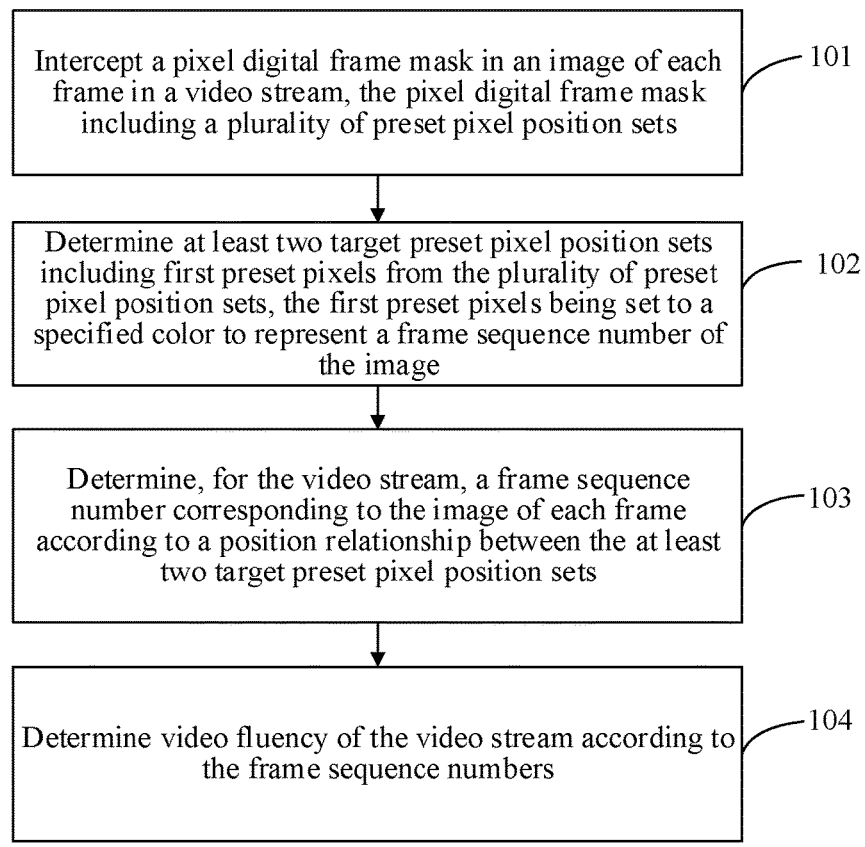
FIG. 2 is a schematic flowchart of an image processing method according to an embodiment of this disclosure.

FIG. 2 is a schematic flowchart of an image processing method according to an embodiment of this disclosure. In this embodiment, descriptions are made from the perspective of an image processing apparatus. The image processing apparatus may be specifically integrated into a cloud host that has a storage unit and has a computing capability due to an installed microprocessor.

The image processing method may include the following steps:

In step 101, a pixel digital frame mask in an image of each frame in a video stream may be obtained (or intercepted), the pixel digital frame mask including a plurality of preset pixel position sets. In an example, for each frame of a video stream, a pixel digital frame mask in the respective frame of the video stream is obtained, the pixel digital frame mask of the respective frame including a plurality of preset pixel position sets Pixels in the embodiment of this disclosure may refer to small blocks that form the image. Each of the small blocks has a clear position and an assigned color value, and the colors and positions of the small blocks determine the appearance of the image.

The video stream may be formed by multiple frames of continuous images, that is, the video stream may be video playback pictures. In an actual scenario, the cloud host transmits the video stream to a user terminal through a network in real-time at a specified frame rate, such as 60 frames per second or 30 frames per second, and the user terminal plays the video stream.

In an embodiment, the video stream may be a video stream generated by a cloud game picture of cloud gaming in a cloud host, a video stream corresponding to a playback picture of a video player, a video stream corresponding to a live stream picture played by a live broadcast platform, or a video formed by a game picture during running of an ordinary game. The embodiment of this disclosure is described by taking the video stream generated by the cloud game picture as an example, which is not specifically limited, and the video stream in other scenarios may also be processed through the image processing method according to this embodiment.

A higher frame rate corresponds to higher fluency and stability of video stream playback, and a better game effect. A lower frame rate corresponds to lower fluency and stability of video stream playback. However, due to different device configurations and network environments of different terminals, supported frame rates are different accordingly. Corresponding to different user terminals, the cloud host needs to evaluate the fluency of a pushed video stream to find a frame rate at which different user terminals feel smooth. Therefore, starting from a high-frequency frame rate of the video stream, frame dropping processing needs to be performed on the video stream of the cloud gaming repeatedly and the fluency needs to be detected according to the video stream after the frame dropping processing until a proper frame rate of the video stream is found.

Since the image of each frame in the video stream in the cloud gaming has no specified sequence number, in order to determine whether playback of the frame-dropped images is uniform and correct, it is necessary to mark the image of each frame in the video stream, so that the uniformity of frame dropping is evaluated by recognizing marks.

In some embodiments, a corresponding mark may be written into the image of each frame in the video stream and the sequence of each image is determined in a manner of optical character recognition (OCR). The OCR may determine a shape of a character by detecting dark and bright patterns, and then translate the shape into computer text by using a character recognition method. However, the complexity of the game pictures of the cloud gaming and technologies such as encoding processing result in noise in parts of the images. The noise is a random change (the object being photographed does not change) of brightness or color information in the images. The noise is usually a manifestation of electronic noise, and is an unwanted by-product in an image generation process, bringing an error and extra information to the images. The noise affects the recognition of marks in the images. As a result, the accuracy rate of image mark detection may be greatly reduced.

In the embodiment of this disclosure, to resolve the foregoing problem, a pixel digital frame mask may be generated in advance. The pixel digital frame mask includes first preset pixels displayed in at least two preset pixel position sets, to form a frame sequence number of an image. A corresponding pixel digital frame mask is added to the image of each frame in the video stream to implement labeling of the frame sequence numbers. Based on this, a server may obtain the pixel digital frame mask corresponding to the image of each frame in the video stream. For example, referring to FIG. 3a, an image 11 in the video stream includes a pixel digital frame mask 111, and the pixel digital frame mask 111 includes a plurality of preset pixel position sets, where the preset pixel position sets may be understood as rectangle strokes that form a digit. The preset pixel position sets are pre-defined, a size of the preset pixel position set may be 2n*n pixels, and the first preset pixel may be a pixel whose (red, green, blue) (RGB) value is (255, 255, 255), that is, a pixel in pure white. Any digit may be shown by setting pixels at the at least two preset pixel position sets to the first preset pixels. For example, digit 1 may be shown by setting the pixels at two preset pixel position sets to the first preset pixels. The pixel digital frame mask 111 includes digits 0, 9, 9, and 1. By combining the digits 0, 9, 9, and 1, it is determined that the frame sequence number of the image 11 is 0991. By analogy, any quantity of frame sequence numbers may be obtained by setting, according to a digital rule, the first preset pixels displayed on the at least two preset pixel position sets, and recognition may be performed more accurately and rapidly afterwards due to a simple expression of the pixel digital frame mask 111.

In step 102, at least two target preset pixel position sets including first preset pixels from the plurality of preset pixel position sets are determined, the first preset pixels being set to a specified color to represent a frame sequence number of the image. In an example, for each frame of the video stream, at least two target preset pixel position sets from the plurality of preset pixel position sets that form a frame sequence number of the respective frame are determined based on values of pixels included in the at least two target preset pixel position sets.

In an embodiment of this disclosure, rectangle strokes (or segments) of each digit are expressed by setting the first preset pixels at the preset pixel position sets in the pixel digital frame mask. Therefore, target preset pixel position sets including the first preset pixels in the pixel digital frame mask need to be determined first, that is, the rectangle strokes that form a digit are determined.

Figure 3A:
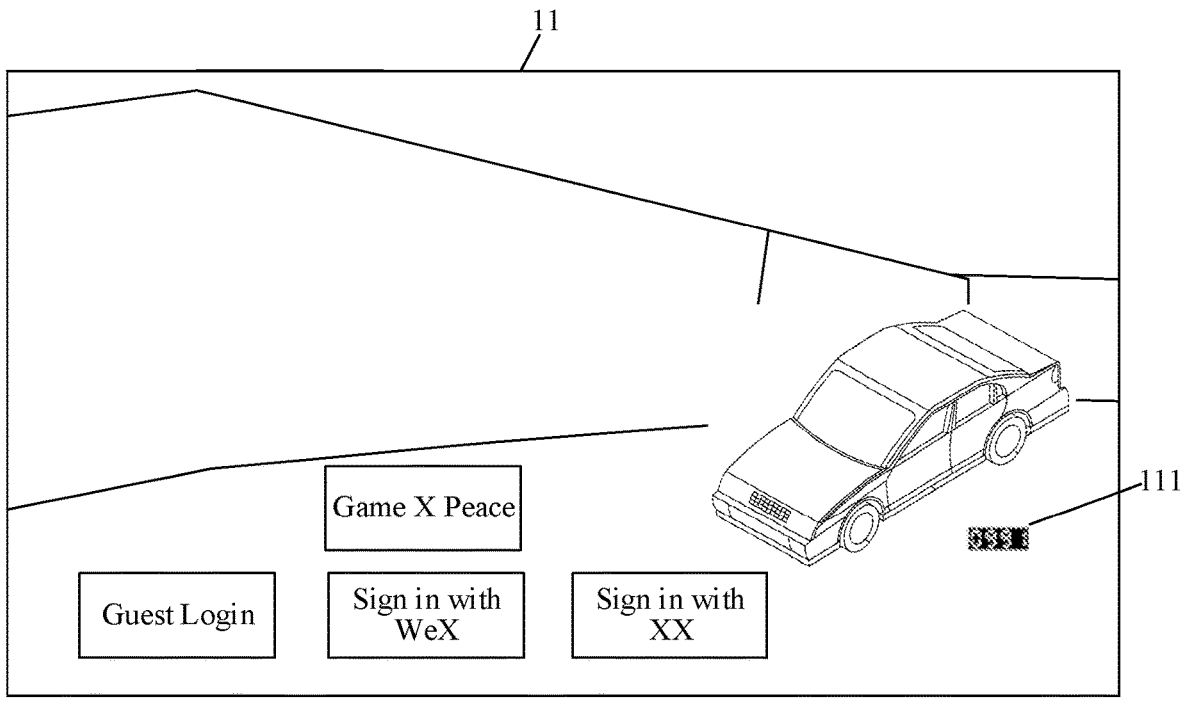
FIG. 3a is a schematic diagram of a scenario of an image processing method according to an embodiment of this disclosure.

For example, referring to FIG. 3a, the pixel digital frame mask 111 includes 7 preset pixel position sets, which are a preset pixel position set 1, a preset pixel position set 2, a preset pixel position set 3, a preset pixel position set 4, a preset pixel position set 5, a preset pixel position set 6, and a preset pixel position set 7 respectively. By analyzing pixels in the preset pixel position set 1, the preset pixel position set 2, the preset pixel position set 3, the preset pixel position set 4, the preset pixel position set 5, the preset pixel position set 6, and the preset pixel position set 7, it is determined that all pixels in the preset pixel position set 1, the preset pixel position set 2, the preset pixel position set 3, the preset pixel position set 4, the preset pixel position set 5, the preset pixel position set 6, and the preset pixel position set 7 are the first preset pixels. Therefore, the preset pixel position set 1, the preset pixel position set 2, the preset pixel position set 3, the preset pixel position set 4, the preset pixel position set 5, the preset pixel position set 6, and the preset pixel position set 7 are all determined as the target preset pixel position sets.

In some implementations, the operation of determining target preset pixel position sets including first preset pixels in the pixel digital frame mask may include the following steps:

(1) determining a plurality of preset pixel position sets in the pixel digital frame mask;
(2) extracting a first preset quantity of pixels from each preset pixel position set; and
(3) determining each preset pixel position set in which all the first preset quantity of pixels are the first preset pixels as the target preset pixel position set.

Figure 3B:
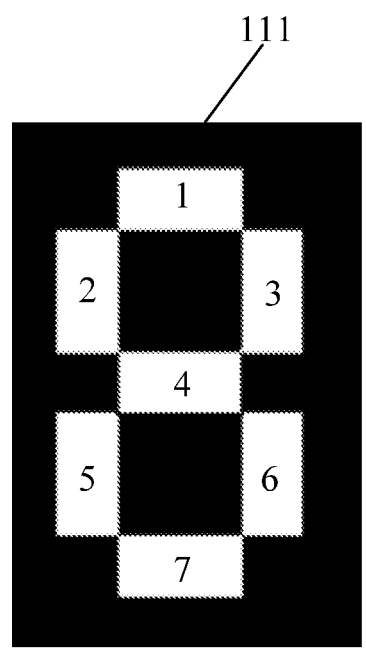
FIG. 3b is a schematic diagram of another scenario of an image processing method according to an embodiment of this disclosure.

The plurality of preset pixel position sets in the pixel digital frame mask may be determined first. Referring to FIG. 3b, the preset pixel position set 1, the preset pixel position set 2, the preset pixel position set 3, the preset pixel position set 4, the preset pixel position set 5, the preset pixel position set 6, and the preset pixel position set 7 in the pixel digital frame mask 111 are determined. A first preset quantity of pixels are extracted from each of the preset pixel position set 1, the preset pixel position set 2, the preset pixel position set 3, the preset pixel position set 4, the preset pixel position set 5, the preset pixel position set 6, and the preset pixel position set 7, and the first preset quantity is 4, that is, 4 pixels in each preset pixel position set are randomly extracted.

Further, assuming that 4 pixels in the preset pixel position set are all the first preset pixels, it may be determined that all the pixels in the preset pixel position set are the first preset pixels. Each preset pixel position set in which all the first preset quantity of pixels are the first preset pixels is determined as the target preset pixel position set, that is, the preset pixel position set 1, the preset pixel position set 2, the preset pixel position set 3, the preset pixel position set 4, the preset pixel position set 5, the preset pixel position set 6, and the preset pixel position set 7 are all determined as the target preset pixel position sets.

In step 103, for the video stream, a frame sequence number corresponding to the image of each frame is determined according to a position relationship between the at least two target preset pixel position sets. In an example, for each frame of the video stream, a frame sequence number corresponding to the respective frame of the video stream is determined according to positions of the at least two target preset pixel position sets in the pixel digital frame mask in the respective frame.

Referring to FIG. 3b, it may be specified that one piece of digit information include 7 preset pixel position sets, that is, a preset pixel position set 1, a preset pixel position set 2, a preset pixel position set 3, a preset pixel position set 4, a preset pixel position set 5, a preset pixel position set 6, and a preset pixel position set 7. In a case that pixels in the preset pixel position set are the first preset pixels, digital strokes are lighted up. In a case that the pixels in the preset pixel position set are not the first preset pixels, digital strokes are not lighted up. Any digit from 0 to 9 may be shown through the preset pixel position set 1, the preset pixel position set 2, the preset pixel position set 3, the preset pixel position set 4, the preset pixel position set 5, the preset pixel position set 6, and the preset pixel position set 7. For example:

0: The preset pixel position sets 1, 2, 3, 5, 6 and 7 are lighted up.
1: The preset pixel position sets 3 and 6 are lighted up.
2: The preset pixel position sets 1, 3, 4, 5, and 7 are lighted up.
3: The preset pixel position sets 1, 3, 4, 6, and 7 are lighted up.
4: The preset pixel position sets 2, 3, 4, and 6 are lighted up.
5: The preset pixel position sets 1, 2, 4, 6, and 7 are lighted up.
6: The preset pixel position sets 1, 2, 4, 5, 6 and 7 are lighted up.
7: The preset pixel position sets 1, 3, and 6 are lighted up.
8: The preset pixel position sets 1, 2, 3, 4, 5, 6, and 7 are lighted up.
9: The preset pixel position sets 1, 2, 3, 4, and 6 are lighted up.

In the embodiment of this disclosure, digit information of any digit may be set as required, which is not specifically limited herein. In this way, in this disclosure, the frame sequence number corresponding to the image of each frame in the video stream may be determined according to a position relationship between the target pixel position sets. The frame sequence number is formed by specified first preset pixels. Therefore, the pixel digital frame mask is not affected even if noise appears in the image, so that the frame sequence number can be recognized more accurately. Moreover, since the pixel digital frame mask and the coordinate information of the preset pixel position sets in the pixel digital frame mask have definite positions in the image, the frame sequence number can be recognized more rapidly.

In some implementations, the operation of determining a frame sequence number corresponding to the image of each frame in the video stream according to a position relationship between the target preset pixel position sets may include the following steps:

(1) marking target preset pixel position sets whose horizontal coordinate spacing is less than a preset threshold as a same-class set;
(2) generating corresponding digit information according to a position relationship between target preset pixel positions in the same-class set; and
(3) determining the frame sequence number corresponding to the image of each frame in the video stream by combining the digit information corresponding to each same-class set.

Since in an actual use process, the frame sequence number may be a single-digit number, a two-digit number, or a three-digit number, the frame sequence number may consist of 1, 2, 3 or more pieces of digit information. Therefore, the digit information may be distinguished through the horizontal coordinate spacing. The target preset pixel position sets whose horizontal coordinate spacing is less than a preset threshold are marked as a same-class set, and the preset threshold may be 10 pixels, that is, the target preset pixel position sets that form the same digit information are classified into one category.

Further, the digit information corresponding to each same-class set is obtained by comparing the position relationship between target preset pixel positions in the same-class set with the foregoing rules. The frame sequence number corresponding to the image of each frame in the video stream is determined by combining the digit information corresponding to each same-class set.

In step 104, video fluency of the video stream is determined according to, or based on, the frame sequence numbers.

It may be detected, according to the frame sequence number corresponding to the image of each frame in the video stream, whether the frame sequence numbers are in a linear sequence. Upon detecting that the frame sequence numbers are in a linear relationship, it is determined that the video fluency of the video stream is smooth; upon detecting that the frame sequence numbers are not in a linear relationship, it is determined that the video fluency of the video stream is non-smooth, and adjustment is needed.

In an implementation, after the frame sequence number of the image of each frame is determined, an image that needs picture evaluation may be quickly located according to the frame sequence number, and the quality of the image may be evaluated and scored through an image quality evaluation algorithm.

As can be known from the above, in the embodiment of this disclosure, the image processing method includes the following steps: obtaining a pixel digital frame mask in an image of each frame in a video stream, the pixel digital frame mask including a plurality of preset pixel position sets; determining at least two target preset pixel position sets including first preset pixels from the plurality of preset pixel position sets, the first preset pixels being set to a specified color to represent a frame sequence number of the image; determining, for the video stream, a frame sequence number corresponding to the image of each frame according to a position relationship between the at least two target preset pixel position sets; and determining video fluency of the video stream according to the frame sequence numbers. In this way, the pixel digital frame mask corresponding to the image of each frame in the video stream may be obtained, the target preset pixel position sets including the first preset pixels are determined in the pixel digital frame mask, and the frame sequence number corresponding to the image of each frame in the video stream is determined according to the arrangement and combination of the target preset pixel position sets, so that the video fluency of the video stream is determined through the accurate frame sequence numbers. Compared with a scheme of directly recognizing a video picture to determine the frame sequence number, the embodiment of this disclosure can more accurately determine the frame sequence number of the image of each frame in the video stream of a cloud application without using picture recognition. A change in the picture of the cloud application does not result in inaccurate recognition, which can greatly improve the accuracy rate of image detection, thereby improving the accuracy of fluency evaluation of the cloud application.

Figure 4:
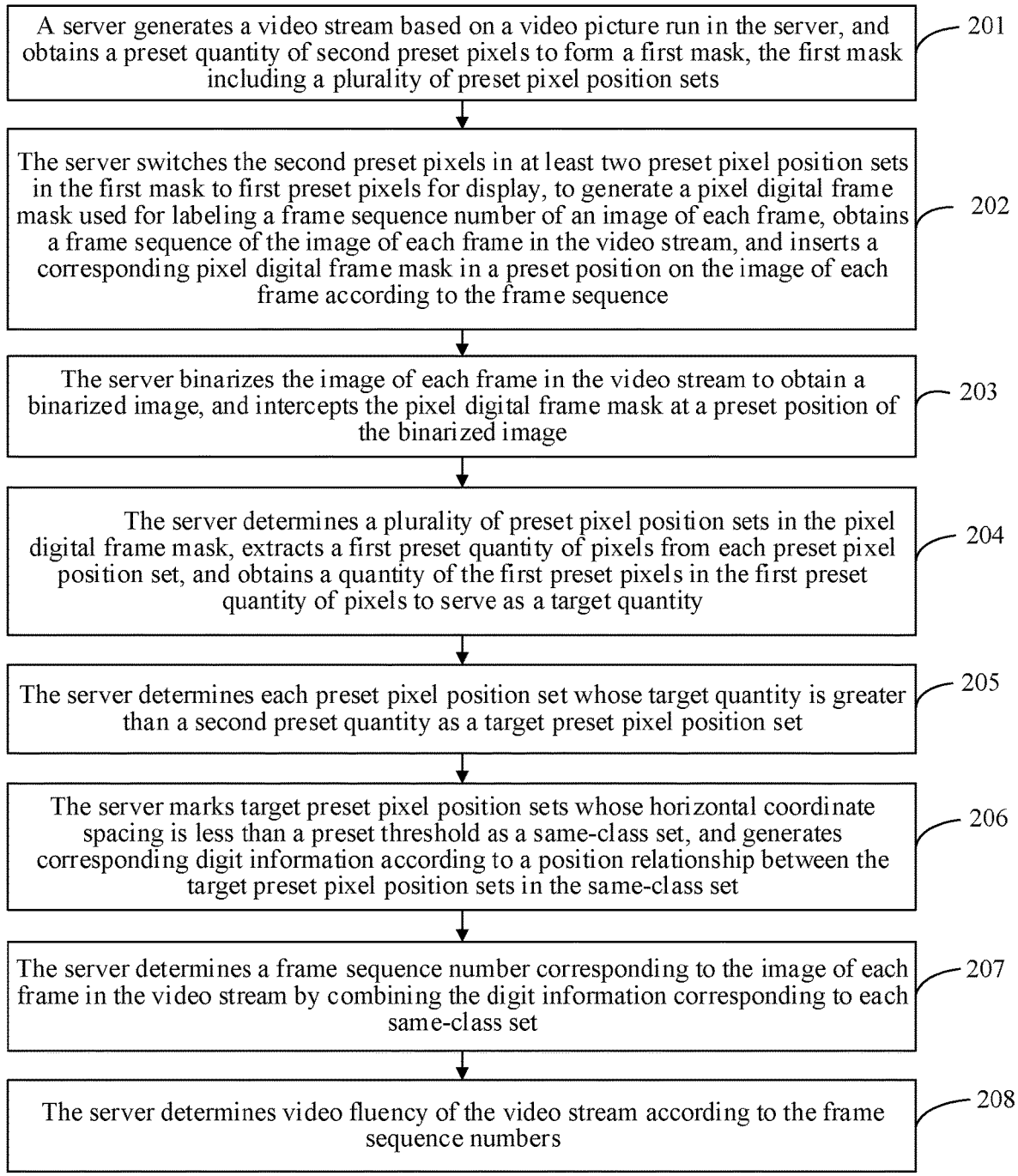
FIG. 4 is another schematic flowchart of an image processing method according to an embodiment of this disclosure.

FIG. 4 is another schematic flowchart of an image processing method according to an embodiment of this disclosure. According to the method described in the embodiment shown in FIG. 3, a detailed description is further made below with an example.

In this embodiment, for example, the image processing apparatus is specifically integrated in a server, the server being a cloud host.

The method process may include the following steps:

In step 201, the server generates a video stream based on a video picture run in the server, and obtains a preset quantity of second preset pixels to form a first mask, the first mask including a plurality of preset pixel position sets.

The second preset pixel may be a pixel whose RGB value is (0, 0, 0), that is, a pixel in pure black. The server may generate the video stream through a video picture corresponding to a cloud application running in a cloud host. An image of each frame in the video stream generated in this manner is an image of the cloud application. A first mask formed by a preset quantity of second preset pixel is obtained, where the preset quantity may be manually set, that is, a pure black canvas in a preset size is generated, and the first mask includes a plurality of preset pixel position sets. For example, the first mask may include 28 preset pixel position sets.

In some embodiments, a size of each preset pixel position sets may be 2n*n pixels, where 2n represents a length, n represents a width, and n is set manually. For example, 3 or 7 preset pixel position sets may form one piece of digit information. That is, in the embodiment of this disclosure, a maximum of 4 digits may be shown, where the smallest number is 1 and the largest number is 9999.

In step 202, the server switches the second preset pixels in the at least two preset pixel position sets in the first mask to first preset pixels for display, to generate a pixel digital frame mask used for labeling a frame sequence number of the image of each frame, obtains a frame sequence of the image of each frame in the video stream, and inserts a corresponding pixel digital frame mask in a preset position on the image of each frame according to the frame sequence.

The first preset pixel may be a pixel whose RGB value is (255, 255, 255), that is, a pixel in pure white. In this way, in order to indicate the frame sequence number, the server may switch the second preset pixels in the at least two preset pixel position sets to the first preset pixels for display. In this way, according to a digital display rule, the pixel digital frame mask of any frame sequence number from 1 to 9999 may be generated.

Further, the frame sequence of the image of each frame in the video stream is obtained. The frame sequence starts from 1, and a corresponding target image and target pixel digital frame mask are determined according to the frame sequence. For example, the obtained frame sequence is 1, which corresponds to an image and a target pixel digital frame mask of the first frame in the video stream, and the frame sequence number of the target pixel digital frame mask is 1. In this way, the target pixel digital frame mask is inserted in the preset position on the target image. For example, referring to FIG. 3a, the target pixel digital frame mask 111 is inserted in the right bottom corner on the target image 11. In this way, the target pixel digital frame mask is inserted in a fixed position on the image, so that the position of a pixel digital frame mask may be quickly located afterwards according to a preset position, thereby obtaining the pixel digital frame mask to recognize the frame sequence number.

In step 203, the server binarizes the image of each frame in the video stream to obtain a binarized image, and obtains the pixel digital frame mask at a preset position of the binarized image.

In order to improve the degree of distinction between the first preset pixel and the second preset pixel in the pixel digital frame mask, the server may binarize the image of each frame in the video stream in advance. The binarization processing may present the entire image with an obvious black and white effect, so as to highlight an outline of the first preset pixel.

Figure 5:
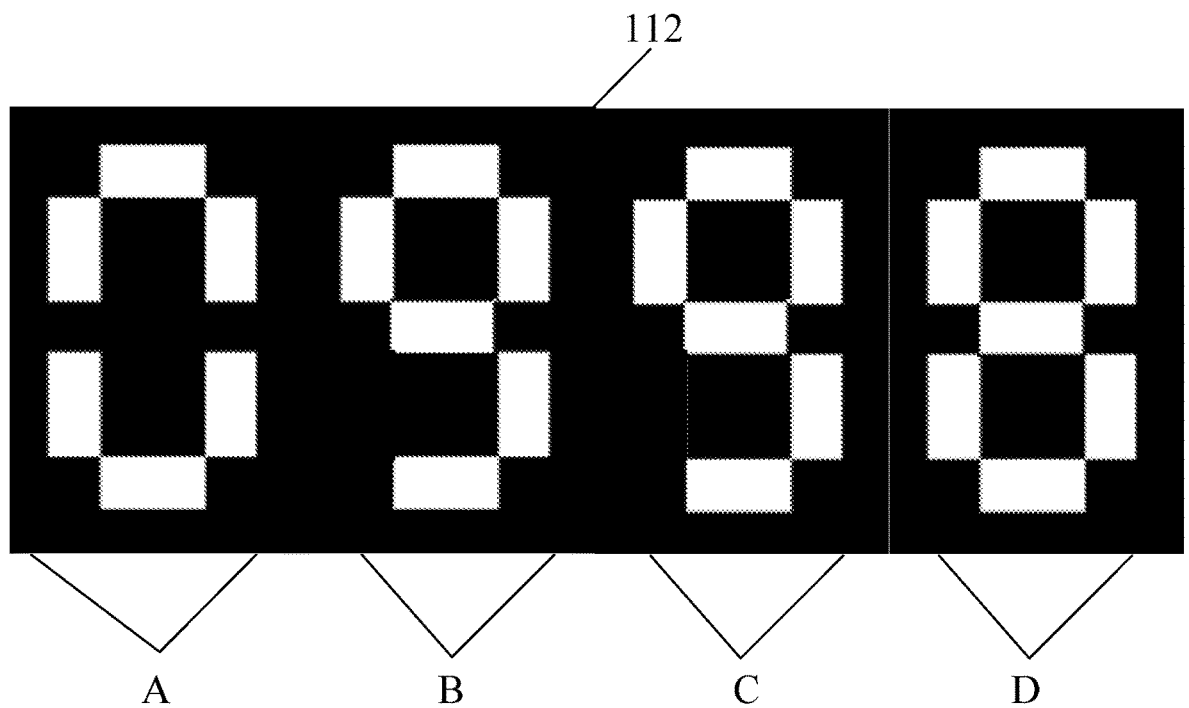
FIG. 5 is a schematic diagram of another scenario of an image processing method according to an embodiment of this disclosure.

Further, the pixel digital frame mask at a preset position on the binarized image is obtained, for example, the pixel digital frame mask on the right bottom corner of the image. Since the server defines the position of the pixel digital frame mask in advance, the pixel digital frame mask is quickly obtained according to the defined position, to as to perform subsequent recognition. Referring to FIG. 5, FIG. 5 shows a pixel digital frame mask 112 at the preset position on the binarized image.

In step 204, the server determines a plurality of preset pixel position sets in the pixel digital frame mask, extracts a first preset quantity of pixels from each preset pixel position set, and obtains a quantity of the first preset pixels in the first preset quantity of pixels to serve as a target quantity.

Referring to FIG. 5, 28 preset pixel position sets included in the pixel digital frame mask 112 are determined. The first preset quantity is set manually. Assuming that the first preset quantity is 4, the server extracts any 4 pixels from each of the 28 preset pixel position sets.

Further, a quantity of the first preset pixels in the first preset quantity of pixels is determined as a target quantity. Assuming that 3 pixels in the 4 pixels are the first preset pixels, the target quantity is 3.

In step 205, the server determines each preset pixel position sets whose target quantity is greater than a second preset quantity as a target preset pixel position set.

Since a cloud application picture needs to be compressed and encoded before transmission, some pixels may lose details. In order to avoid misjudgment, the second preset quantity may be set, and the second preset quantity is less than the first preset quantity. Assuming that the second preset quantity may be 2, the server determines each preset pixel position set whose target quantity is greater than 2 as the target preset pixel position set. Referring to FIG. 5, 25 target preset pixel position sets are determined.

In step 206, the server marks target preset pixel position sets whose horizontal coordinate spacing is less than a preset threshold as a same-class set, and generates corresponding digit information according to a position relationship between the target preset pixel position sets in the same-class set.

Referring to FIG. 5, horizontal coordinate spacing between different digit information is fixed and vertical coordinates of different digit information are close to each other. In this way, the server may mark target preset pixel position set whose horizontal coordinate spacing is less than the preset threshold as a same-class set, so as to obtain a set A, a set B, a set C and a set D. Referring to FIG. 3b, it may be set that one piece of digit information includes 7 preset pixel position sets, that is, a preset pixel position set 1, a preset pixel position set 2, a preset pixel position set 3, a preset pixel position set 4, a preset pixel position set 5, a preset pixel position set 6, and a preset pixel position set 7. In a case that pixels in the preset pixel position sets are the first preset pixels, digital strokes are lighted up. In a case that the pixels in the preset pixel position sets are not the first preset pixels, digital strokes are not lighted up. Any digit from 0 to 9 may be shown through the preset pixel position set 1, the preset pixel position set 2, the preset pixel position set 3, the preset pixel position set 4, the preset pixel position set 5, the preset pixel position set 6, and the preset pixel position set 7. For example:

0: The preset pixel position sets 1, 2, 3, 5, 6 and 7 are lighted up.
1: The preset pixel position sets 3 and 6 are lighted up.
2: The preset pixel position sets 1, 3, 4, 5, and 7 are lighted up.
3: The preset pixel position sets 1, 3, 4, 6, and 7 are lighted up.
4: The preset pixel position sets 2, 3, 4, and 6 are lighted up.
5: The preset pixel position sets 1, 2, 4, 6, and 7 are lighted up.
6: The preset pixel position sets 1, 2, 4, 5, 6 and 7 are lighted up.
7: The preset pixel position sets 1, 3, and 6 are lighted up.
8: The preset pixel position sets 1, 2, 3, 4, 5, 6, and 7 are lighted up.
9: The preset pixel position sets 1, 2, 3, 4, and 6 are lighted up.

In this way, through deduction based on the position relationship between the target preset pixel position sets in the same-class set according to the foregoing rule, the server generates digit information 0, 9, 9, and 8 corresponding to the set A, the set B, the set C, and the set D.

In step 207, the server determines a frame sequence number corresponding to the image of each frame in the video stream by combining the digit information corresponding to each same-class set.

The server combines the digit information 0, 9, 9, and 8 corresponding to the set A, the set B, the set C, and the set D to recognize that the frame sequence number of the current image is 0998. By analogy, the server can recognize the frame sequence number corresponding to the image of each frame in the video stream more rapidly and accurately.

In step 208, the server determines video fluency of the video stream according to the frame sequence numbers.

After determining the frame sequence number of each image in the video stream, the server detects whether the frame sequence numbers are in a linear sequence. Upon detecting that the frame sequence numbers are in a linear sequence, it is determined that the video fluency of the video stream is smooth; upon detecting that the frame sequence numbers are not in a linear sequence, it is determined that the video fluency of the video stream is non-smooth, and adjustment is needed.

As can be known from the above, in the embodiment of this disclosure, the image processing method includes the following steps: obtaining a pixel digital frame mask in an image of each frame in a video stream, the pixel digital frame mask including a plurality of preset pixel position sets; determining at least two target preset pixel position sets including first preset pixels from the plurality of preset pixel position sets, the first preset pixels being set to a specified color to represent a frame sequence number of the image; determining, for the video stream, a frame sequence number corresponding to the image of each frame according to a position relationship between the at least two target preset pixel position sets; and determining video fluency of the video stream according to the frame sequence numbers. In this way, the pixel digital frame mask corresponding to the image of each frame in the video stream may be obtained, the target preset pixel position sets including the first preset pixels are determined in the pixel digital frame mask, and the frame sequence number corresponding to the image of each frame in the video stream is determined according to the arrangement and combination of the target preset pixel position sets, so that the video fluency of the video stream is determined through the accurate frame sequence numbers. Compared with a scheme of directly recognizing a video picture to determine the frame sequence number, the embodiment of this disclosure can more accurately determine the frame sequence number of the image of each frame in the video stream of a cloud application without using picture recognition. A change in the picture of the cloud application does not result in inaccurate recognition, which may greatly improve the accuracy rate of image detection, thereby improving the accuracy of fluency evaluation of the cloud application.

To help better implement the image processing method according to the embodiments of this disclosure, an apparatus based on the foregoing image processing method is further provided in the embodiments of this disclosure. Terms have meanings the same as those in the foregoing image processing method. For specific implementation details, reference may be made to the description in the method embodiments.

Figure 6:
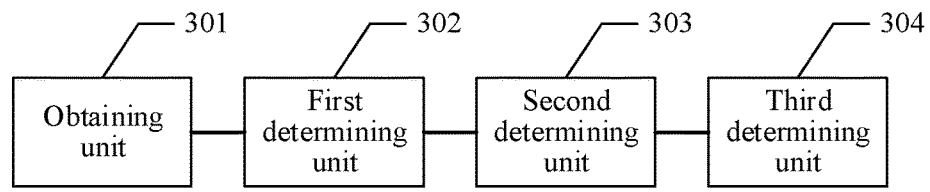
FIG. 6 is a schematic structural diagram of an image processing apparatus according to an embodiment of this disclosure.

FIG. 6 is a schematic structural diagram of an image processing apparatus according to an embodiment of this disclosure. One or more modules, submodules, and/or units of the apparatus can be implemented by processing circuitry, software, or a combination thereof, for example. The image processing apparatus may include: an obtaining unit 301, a first determining unit 302, a second determining unit 303, and a third determining unit 304, and the like.

The obtaining unit 301 is configured to obtain a pixel digital frame mask in an image of each frame in a video stream, the pixel digital frame mask including a plurality of preset pixel position sets.

The pixel digital frame mask may be generated in advance. The pixel digital frame mask includes first preset pixels displayed on at least two preset pixel position sets to form a frame sequence number of the image. A corresponding pixel digital frame mask is added to the image of each frame in the video stream to implement frame sequence number labeling. Based on this, the obtaining unit 301 may obtain the pixel digital frame mask corresponding to the image of each frame in the video stream.

In some implementations, the obtaining unit 301 is configured to: binarize the image of each frame in the video stream to obtain a binarized image; and obtain the pixel digital frame mask at a preset position of the binarized image.

The first determining unit 302 is configured to determine at least two target preset pixel position sets including first preset pixels from the plurality of preset pixel position sets, the first preset pixels being set to a specified color to represent a frame sequence number of the image.

The first determining unit 302 sets the first preset pixels at the preset pixel position sets in the pixel digital frame mask to express rectangle strokes of each digit. Therefore, target preset pixel position sets including the first preset pixels in the pixel digital frame mask need to be determined first, that is, the rectangle strokes that form a digit are determined.

In some implementations, the first determining unit 302 includes a first determining subunit, an extracting subunit, and a second determining subunit.

The first determining subunit is configured to determine a plurality of preset pixel position sets in the pixel digital frame mask.

The extracting subunit is configured to extract a first preset quantity of pixels from each preset pixel position set.

The second determining subunit is configured to determine each preset pixel position set in which all the first preset quantity of pixels are the first preset pixels as the target preset pixel position set.

In some implementations, the second determining subunit is configured to: obtain a quantity of the first preset pixels in the first preset quantity of pixels to serve as a target quantity; and determine each preset pixel position set whose target quantity is greater than a second preset quantity as the target preset pixel position set, the second preset quantity being less than the first preset quantity.

The second determining unit 303 is configured to determine, for the video stream, a frame sequence number corresponding to the image of each frame according to a position relationship between the target preset pixel position sets.

The second determining unit 303 may determine the frame sequence number corresponding to the image of each frame in the video stream according to a position relationship between the target preset pixel position sets. The frame sequence number is formed by specified first preset pixels. Therefore, the pixel digital frame mask is not affected even if noise appears in the image, so that the frame sequence number can be recognized more accurately. Moreover, since the pixel digital frame mask and the coordinate information of the preset pixel position sets in the pixel digital frame mask have definite positions in the image, the frame sequence number can be recognized more rapidly.

In some embodiments, the second determining unit 303 is configured to: mark target preset pixel position sets whose horizontal coordinate spacing is less than a preset threshold as a same-class set; generate corresponding digit information according to a position relationship between the target preset pixel position sets in the same-class set; and determine the frame sequence number corresponding to the image of each frame in the video stream by combining the digit information corresponding to each same-class set.

The third determining unit 304 is configured to determine video fluency of the video stream according to the frame sequence numbers.

The third determining unit 304 may detect whether the frame sequence numbers are in a linear sequence according to the frame sequence number corresponding to the image of each frame in the video stream. Upon detecting that the frame sequence numbers are in a linear sequence, the third determining unit 304 determines that the video fluency of the video stream is smooth; upon detecting that the frame sequence numbers are not in a linear sequence, the third determining unit 304 determines that the video fluency of the video stream is non-smooth, and adjustment is needed.

In some implementations, the apparatus further includes a video stream generation unit, configured to generate the video stream based on an application picture run in a server.

For specific implementation of the foregoing units, reference may be made to the foregoing embodiments, which are not described repeatedly herein.

As can be known from the above, in the embodiment of this disclosure, the obtaining unit 301 obtains a pixel digital frame mask corresponding to an image of each frame in a video stream; the first determining unit 302 determines target preset pixel position sets including first preset pixels from the pixel digital frame mask; the second determining unit 303 determines, for the video stream, a frame sequence number corresponding to the image of each frame according to a position relationship between the target preset pixel position sets; and the third determining unit 304 determines video fluency of the video stream according to the frame sequence numbers. In this way, the pixel digital frame mask corresponding to the image of each frame in the video stream may be obtained, the target preset pixel position sets including the first preset pixels are determined in the pixel digital frame mask, and the frame sequence number corresponding to the image of each frame in the video stream is determined according to the arrangement and combination of the target preset pixel position sets, so that the video fluency of the video stream is determined through the accurate frame sequence numbers. Compared with a scheme of directly recognizing a video picture to determine the frame sequence number, the embodiment of this disclosure can more accurately determine the frame sequence number of the image of each frame in the video stream of a cloud application without using picture recognition. A change in the picture of the cloud application does not result in inaccurate recognition, which may greatly improve the accuracy rate of image detection, thereby improving the accuracy of fluency evaluation of the cloud application.

Figure 7:
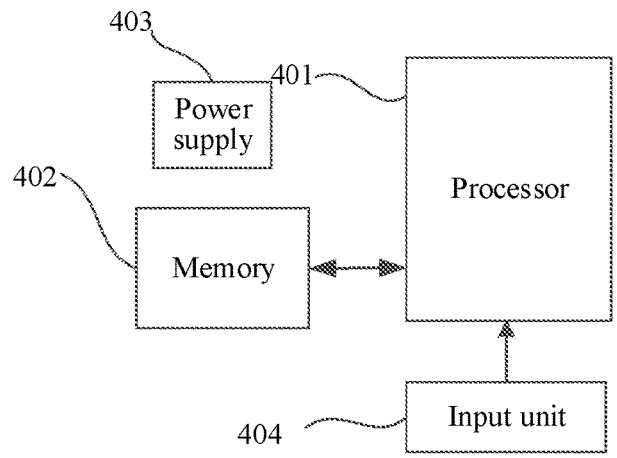
FIG. 7 is a schematic structural diagram of a server according to an embodiment of this disclosure.

An embodiment of this disclosure further provides a server. As shown in FIG. 7, FIG. 7 is a schematic structural diagram of a server used in the embodiments of this disclosure.

Specifically, the server may be a cloud host, and may include components such as processing circuitry (for example, a processor 401 including one or more processing cores), a memory 402 including one or more computer-readable storage mediums, a power supply 403, and an input unit 404. A person skilled in the art may understand that the server structure shown in FIG. 7 does not constitute a limit to the server. The server may include more or fewer components than those shown in the figure, may combine some components, or may have different component arrangements. The processor 401 is a control center of the server, and is connected to various parts of the entire server by using various interfaces and lines. By running or executing a software program and/or module stored in the memory 402, and invoking data stored in the memory 402, the processor 401 executes various functions of the server and processes data, so as to monitor the entire server.

In some embodiments, the processor 401 may include one or more processing cores. In some embodiments, the processor 401 may integrate an application processor and a modem processor. The application processor mainly processes an operating system, a user interface, an application program, and the like. The modem processor mainly processes wireless communication. It may be understood that the modem processor may either not be integrated into the processor 401.

The memory 402 may be configured to store a software program and a module, and the processor 401 runs the software program and the module that are stored in the memory 402, to implement various functional applications and data processing. The memory 402 may mainly include a program storage area and a data storage area. The program storage area may store the operating system, the application program required by at least one function (for example, a sound playing function and an image playing function), and the like. The data storage area may store data created according to use of the server. In addition, the memory 402 may include a high speed RAM, and may further include a non-volatile memory, such as at least one magnetic disk storage device, a flash memory, or another volatile solid storage device. Correspondingly, the memory 402 may further include a memory controller, so that the processor 401 can access the memory 402.

The server further includes the power supply 403 for supplying power to the components. In some embodiments, the power supply 403 may be logically connected to the processor 401 by using a power supply management system, so as to implement functions, such as charging/discharging management, and power consumption management, by using the power supply management system. The power supply 403 may further include one or more direct current or alternating current power supplies, a re-charging system, a power failure detection circuit, a power supply converter or inverter, a power supply state indicator, and any other component.

The server may further include the input unit 404 configured to receive input digit or character information, and generate a keyboard, mouse, joystick, optical or track ball signal input related to the user setting and function control.

Although not shown in the figure, the server may further include a display processor, and the like. Details are not further described herein. Specifically, in this embodiment, the processor 401 in the server may load, according to the following instructions, executable files corresponding to processes of one or more application programs into the memory 402. The processor 401 runs the application programs stored in the memory 402, to implement various functions as follows: obtaining a pixel digital frame mask in an image of each frame in a video stream, the pixel digital frame mask including a plurality of preset pixel position sets; determining at least two target preset pixel position sets including first preset pixels from the plurality of preset pixel position sets, the first preset pixels being set to a specified color to represent a frame sequence number of the image; determining, for the video stream, a frame sequence number corresponding to the image of each frame according to a position relationship between the at least two target preset pixel position sets; and determining video fluency of the video stream according to the frame sequence numbers.

In the foregoing embodiments, the descriptions of the embodiments have respective focuses. For a part that is not described in detail in an embodiment, reference may be made to the foregoing detailed description of the image processing method. Details are not described herein again.

As can be known from the above, in the embodiment of this disclosure, the server may obtain a pixel digital frame mask corresponding to an image of each frame in a video stream; determine target preset pixel position sets including first preset pixels from the pixel digital frame mask; determine a frame sequence number corresponding to the image of each frame in the video stream according to a position relationship between the target preset pixel position sets; and determine video fluency of the video stream according to the frame sequence numbers. In this way, the pixel digital frame mask corresponding to the image of each frame in the video stream may be obtained, the target preset pixel position sets including the first preset pixels are determined in the pixel digital frame mask, and the frame sequence number corresponding to the image of each frame in the video stream is determined according to the arrangement and combination of the target preset pixel position sets, so that the video fluency of the video stream is determined through the accurate frame sequence numbers. Compared with a scheme of directly recognizing a video picture to determine the frame sequence number, the embodiment of this disclosure can more accurately determine the frame sequence number of the image of each frame in the video stream of a cloud application without using picture recognition. A change in the picture of the cloud application does not result in inaccurate recognition, which may greatly improve the accuracy rate of image detection, thereby improving the accuracy of fluency evaluation of the cloud application.

A person of ordinary skill in the art could understand that, all or some steps of various methods in the embodiments may be implemented through instructions, or implemented through instructions controlling relevant hardware, and the instructions may be stored in a computer-readable storage medium and loaded and executed by a processor.

Accordingly, an embodiment of this disclosure provides a computer-readable storage medium, storing a plurality of instructions, the instructions being loaded by a processor, to perform the steps in any one of the image processing methods according to the embodiments of this disclosure. For example, the instructions may perform the following steps: obtaining a pixel digital frame mask in an image of each frame in a video stream, the pixel digital frame mask including a plurality of preset pixel position sets; determining at least two target preset pixel position sets including first preset pixels from the plurality of preset pixel position sets, the first preset pixels being set to a specified color to represent a frame sequence number of the image; determining, for the video stream, a frame sequence number corresponding to the image of each frame according to a position relationship between the at least two target preset pixel position sets; and determining video fluency of the video stream according to the frame sequence numbers.

According to an aspect of this disclosure, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, so that the computer device performs the methods provided in the various exemplary implementations according to the foregoing embodiments.

For specific implementation of the foregoing operations, reference may be made to the foregoing embodiments. Details are not described herein again.

The computer-readable storage medium, such as a non-transitory computer-readable storage medium, may include:

a read-only memory (ROM), a random access memory (RAM), a magnetic disk, an optical disc and the like.

Because the instructions stored in the computer-readable storage medium may perform the steps of any image processing method provided in the embodiments of this disclosure, the instructions can implement beneficial effects that may be implemented by any image processing method in the embodiments of this disclosure. For details, reference may be made to the foregoing embodiments. Details are not described herein again.

An exemplary image processing method and apparatus, and the computer-readable storage medium provided in the embodiments of this disclosure are described in detail above. Although the principles and implementations of this disclosure are described by using specific examples in this specification, the descriptions of the foregoing embodiments are merely used to facilitate understanding of this disclosure. Meanwhile, a person skilled in the art may make modifications in terms of the specific implementations and disclosure scopes according to the idea of this disclosure. Other embodiments are with the scope of this disclosure.

What is claimed is:

1. An image processing method, comprising:
obtaining, for each frame of a video stream, a pixel digital frame mask in the respective frame of the video stream, the pixel digital frame mask of the respective frame including a plurality of preset pixel position sets;
determining, for each frame of the video stream, at least two target preset pixel position sets from the plurality of preset pixel position sets that form a frame sequence number of the respective frame based on values of pixels included in the at least two target preset pixel position sets;
determining, by processing circuitry for each frame of the video stream, a frame sequence number corresponding to the respective frame of the video stream according to positions of the at least two target preset pixel position sets in the pixel digital frame mask in the respective frame; and
determining video fluency of the video stream based on the frame sequence numbers.

2. The image processing method according to claim 1, wherein the pixels included in the at least two target preset pixel position sets of the respective frame are first preset pixels that are set to a specified pixel value to represent the frame sequence number of the respective frame.

3. The image processing method according to claim 1, wherein each of the plurality of preset pixel positions sets correspond to a different segment of 8.

4. The image processing method according to claim 2, wherein
the plurality of preset pixel position sets includes rectangular segments that are configured to form a digit, and
the pixel value of the first preset pixel corresponds to pure white.

5. The image processing method according to claim 1, wherein the determining the video fluency comprises:
determining that the video fluency of the video stream is smooth based on a determination that the frame sequence numbers are in a linear sequence; and
determining that the video fluency of the video stream is non-smooth based on a determination that the frame sequence numbers are not in the linear sequence.

6. The image processing method according to claim 2, wherein the determining the at least two target preset pixel position sets for the respective frame comprises:
determining the plurality of preset pixel position sets in the pixel digital frame mask;
extracting a first quantity of pixels from each of the plurality of preset pixel position sets; and
determining each of the plurality of preset pixel position sets in which all the first preset quantity of pixels are the first preset pixels as a respective one of the at least two target preset pixel position sets.

7. The image processing method according to claim 6, wherein the determining the at least two target preset pixel position sets for the respective frame comprises:
obtaining a quantity of the first preset pixels in the first quantity of pixels from each of the plurality of preset pixel position sets to serve as a target quantity; and
determining each of the plurality of preset pixel position sets with the target quantity that is greater than a second quantity as a respective one of the at least two target preset pixel position sets, the second quantity being less than the first quantity.

8. The image processing method according to claim 1, wherein the determining the frame sequence number for the respective frame comprises:
marking target preset pixel position sets of the at least two target preset pixel position sets with horizontal coordinate spacing that is less than a preset threshold as a same-class set;
generating corresponding digit information according to a position relationship between the target preset pixel positions in the same-class set; and
determining the frame sequence number of the respective frame in the video stream by combining the digit information corresponding to each same-class set.

9. The image processing method according to claim 1, further comprising:
generating the pixel digital frame masks; and
inserting the corresponding pixel digital frame masks into the respective frames of the video stream.

10. The image processing method according to claim 9, wherein the generating the pixel digital frame masks comprises:
obtaining a quantity of second preset pixels to form a first mask, the first mask including the plurality of preset pixel position sets; and
switching the second preset pixels in the at least two preset pixel position sets to first preset pixels for display, to generate one of the pixel digital frame masks.

11. The image processing method according to claim 9, wherein the inserting the corresponding pixel digital frame masks comprises:
for each frame in the video stream,
obtain the frame sequence number of the respective frame in the video stream;
determining the corresponding pixel digital frame mask according to the frame sequence number of the respective frame; and
inserting the pixel digital frame mask corresponding to the respective frame at a preset position of the respective frame.

12. The image processing method according to claim 11, wherein the obtaining the pixel digital frame mask comprises:
binarizing each frame in the video stream to obtain a binarized image; and
obtaining the pixel digital frame mask of each frame at the preset position of the binarized image of the respective frame.

13. The image processing method according to claim 1, further comprising:
generating the video stream based on a video picture generated by a server.

14. An image processing apparatus, comprising:
processing circuitry configured to:
obtain, for each frame of a video stream, a pixel digital frame mask in the respective frame of the video stream, the pixel digital frame mask of the respective frame including a plurality of preset pixel position sets;
determine, for each frame of the video stream, at least two target preset pixel position sets from the plurality of preset pixel position sets that form a frame sequence number of the respective frame based on values of pixels included in the at least two target preset pixel position sets;
determine, for each frame of the video stream, a frame sequence number corresponding to the respective frame of the video stream according to positions of the at least two target preset pixel position sets in the pixel digital frame mask in the respective frame; and
determine video fluency of the video stream based on the frame sequence numbers.

15. The image processing apparatus according to claim 14, wherein the pixels included in the at least two target preset pixel position sets of the respective frame are first preset pixels that are set to a specified pixel value to represent the frame sequence number of the respective frame.

16. The image processing apparatus according to claim 14, wherein each of the plurality of preset pixel positions sets correspond to a different segment of 8.

17. The image processing apparatus according to claim 15, wherein
the plurality of preset pixel position sets includes rectangular segments that are configured to form a digit, and
the pixel value of the first preset pixel corresponds to pure white.

18. The image processing apparatus according to claim 14, wherein the processing circuitry is configured to:
determine that the video fluency of the video stream is smooth based on a determination that the frame sequence numbers are in a linear sequence; and
determine that the video fluency of the video stream is non-smooth based on a determination that the frame sequence numbers are not in the linear sequence.

19. The image processing apparatus according to claim 15, wherein the processing circuitry is configured to:
determine the plurality of preset pixel position sets in the pixel digital frame mask;
extract a first quantity of pixels from each of the plurality of preset pixel position sets; and
determine each of the plurality of preset pixel position sets in which all the first preset quantity of pixels are the first preset pixels as a respective one of the at least two target preset pixel position sets.

20. A non-transitory computer-readable storage medium, storing instructions which when executed by one or more processors cause the one or more processors to perform:
obtaining, for each frame of a video stream, a pixel digital frame mask in the respective frame of the video stream, the pixel digital frame mask of the respective frame including a plurality of preset pixel position sets;
determining, for each frame of the video stream, at least two target preset pixel position sets from the plurality of preset pixel position sets that form a frame sequence number of the respective frame based on values of pixels included in the at least two target preset pixel position sets;
determining, for each frame of the video stream, a frame sequence number corresponding to the respective frame of the video stream according to positions of the at least two target preset pixel position sets in the pixel digital frame mask in the respective frame; and
determining video fluency of the video stream based on the frame sequence numbers.

\* \* \* \* \*